Oct. 7, 1930.   D. T. SCOTT   1,777,899
REVERSING GEAR FOR POWER DRIVEN SHAFTS
Filed March 5, 1929

D. T. Scott
Inventor
Albert E. Dieterich
Attorney

Patented Oct. 7, 1930

1,777,899

UNITED STATES PATENT OFFICE

DAVID T. SCOTT, OF VANCOUVER, BRITISH COLUMBIA, CANADA

REVERSING GEAR FOR POWER-DRIVEN SHAFTS

Application filed March 5, 1929. Serial No. 344,379.

This invention relates to improvements in the reversing mechanism of marine engines and other prime movers and has special reference to the reversal of direction of rotation of the propeller shaft of a boat or vessel in order to cause such vessel to stop quickly or to go astern if required, the engine or source of power, however, not being reversed but continuing to rotate in the same direction as when driving the vessel forward.

The object of the invention is to provide a strong, simple, easily installed mechanism of the clutch type in which unusually large leverage is obtained for the contraction or expansion of the radially moving clutch members and a special feature of which is the assembly as a unit of the gear wheels and cage forming the reversing portion of the device, this unit being easily and quickly withdrawn for examination or repair, being meantime replaced by another similar unit, thus effecting an important reduction of the laying-up time of the vessel.

The invention consists essentially in the provision of a cylindrical drum adapted to contain a cage in which are assembled an engaged set of planetary gear wheels of the type common in the differential gears of automobiles, this cage being insertable within or withdrawable from the drum as a unit, thus saving a large amount of fitting and adjusting of these members in the dark and confined spaces of a boat. The correct assembly and alignment of the gears can thus be done under machine shop conditions before the cage unit is placed in the drum or the latter in its place in the boat.

The drum carries an extension by which it may be frictionally engaged either by a rotating member driven by the engine or by an anchored band which constrains it against rotation, the latter condition actuating the planetary gears inside the drum and causing the reversal of the propeller shaft.

A second special feature consists in the direct and powerful combination of levers whereby the rearward motion of the main control lever is made use of to actuate the anchored band referred to and thus firmly grip the cylindrical drum under all conditions of vibration of shock.

Another and important feature of the invention is the fact that the said cage and planetary gear assembly being of the normal type manufactured in large quantities for the back axles of automobiles of various sizes can be supplied by the manufacturers, thus creating another outlet for the mechanism already manufactured in quantity, and obtainable more cheaply for use in this connection than if its manufacture had to be undertaken directly by the constructors of this device.

The invention is clearly described by reference to the drawings herewith, which accompany and form part of this application, and in which.

Figure 1:
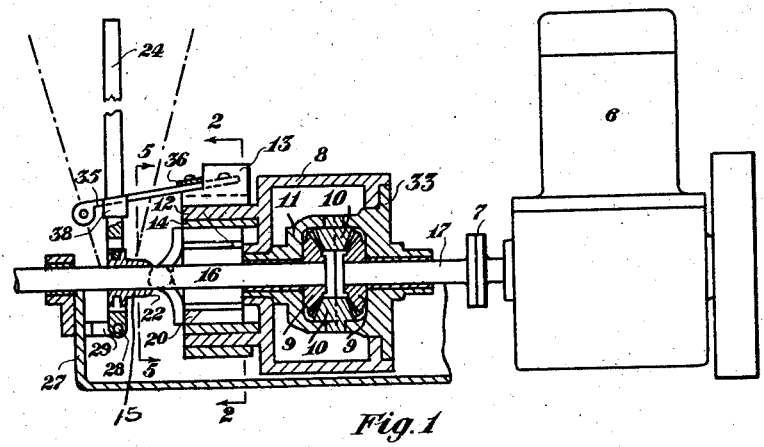
Figure 1 is a longitudinal elevation of the device.
Figure 3:
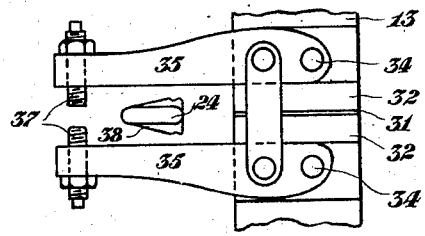
Figure 3 is an enlarged plan of the system of levers which cause the contraction of the gripping member operating the reverse mechanism.

In these views the numeral 6 indicates the engine or source of power, the crank shaft of which is connected by the coupling 7 and the shaft 17 to the reversing device. The latter consists of a circular drum 8 containing the bevel gears 9 and the engaged balance pinions 10 assembled in the gear cage 11, the latter being bolted to the drum 8 by means of the flange extension 33. The bevel wheels 9 are keyed to the shafts 16 and 17 respectively, while the balance pinions 10 are carried in bearings in the cage 11.

The circular drum 8 is provided with a rearward extension 12 which is adapted to be engaged on its exterior face by the contractible member 13, and on its interior face by the expansible member 14.

Figure 5:
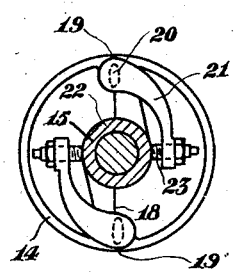
Figure 5 is a section on the line 5—5 in Figure 1 showing the expanding mechanism used in the forward drive.
Figure 2:
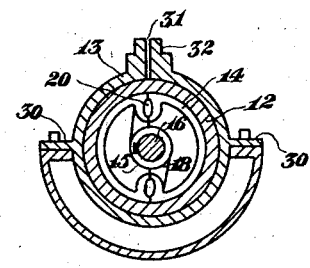
Figure 2 is a transverse section taken on the line 2—2 in Figure 1.

The member 14 is shown in end view in Figure 5 and in section in Figure 2. It consists of a central boss portion 15 keyed to the propeller shaft 16, and carrying a circular rim by means of the arms 18. The rim is cut through at two diametrically opposite points 19 and is expansible at these points by means of the cams 20 which are rotated by the levers 21.

Figure 4:
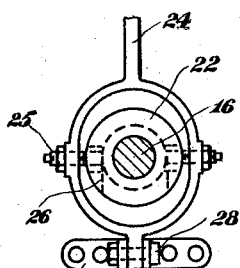
Figure 4 is a partial end view of the control lever showing its pivotal connection to the frame and its engagement with the sliding member operating the forward drive mechanism.

A cone shaped member 22 is slidably mounted upon the shaft 16 and is adapted to engage with the adjustable screws 23 in the ends of the levers 21, and force the latter radially outward rotating them about the cam centres, thus expanding the rim of the member 14, and causing it to grip the interior surface of the drum extension 12 and drive it with the shaft 16. The member 22 is moved axially by means of the control lever 24, which, as shown in Figure 4, is adapted to encircle the shaft 16 and member 22 and engage the latter through the pins 25 and the horse-shoe shaped collar 26.

The control lever 24 is pivoted to the engine frame 27 by means of the pin 28 carried by the bracket 29, and when moved forward in the direction of the engine 6 causes the member 22 to separate the inner ends of the levers 21, thus actuating the cams 20 and expanding the member 14 to grip the drum extension 12. When the lever 24 is withdrawn to the central or vertical position illustrated in Figure 1 the grip of the member 14 is released, and the drum extension 12 is no longer driven thereby.

Mounted on the exterior of the drum extension 12 is a member 13 provided with lugs 30 by which it is constrained by the engine frame against rotation. This member 13 is split at the point 31, and provided with lugs 32 whereby it can be contracted upon the drum extension 12 and thus prevent the latter from rotating. When this is done, the drum 8 and consequently the reverse gear cage 11, are held against rotation, and the engine drive passes from the shaft 17 through the bevel wheels 9 and pinions 10 to the shaft 16; the direction of rotation of this shaft being thereby reversed.

The contraction of the member 13 is effected by the motion of the control lever 24 in the following way: Rotatably mounted upon the lugs 32 by means of the pins 34 are two similar levers 35 joined by a link 36, the rear ends of these levers being extended so as to pass one upon each side of the control lever 24, and being provided with adjustable contact screws 37. The control lever 24 is provided with a wedge-shaped protuberance 38 intermediate of its ends and adapted to engage with and separate the screws 37 and consequently force the rear ends of the levers 35 apart, and thus cause the pins 34 to approach one another, thus closing the gap between the lugs 32 and contracting the member 13 upon the extension 12 of the drum. The member 13 being anchored against rotation by its engagement with the frame thus prevents rotation of the drum 8 and of the cage member 11 secured thereto, thus causing the engine drive to pass through the bevel gears and become reversed as above described.

The operation of the device is effected by the simple movement forward or backward of the control lever 24. In the central position of this lever, as shown in Figure 1, the drum 8 is not driven by the engine, and the propeller shaft is at rest. The forward movement of the lever 24 (toward the engine) results in the frictional engagement of the member 14 with the drum extension 12 and the consequent rotation of the drum and therefore the propeller shaft 16.

A rearward movement of the lever 24 actuates the lever mechanism 35 resulting in the gripping of the drum extension 12 by the anchored band 13 and the reversing of the propeller shaft 16 through the action of the planetary gears 9 and 10.

Having now particularly described my invention, what I claim and desire to be protected in by Letters Patent, is:

1. In reversing gears, a driving shaft and a driven shaft aligned therewith, a differential gear unit mounted on the adjacent ends of said shafts and including a cage with pinions meshing with gears on said shafts, a rotatable drum having a head at one end apertured to receive a part of said cage and internally flanged adjacent the other end to cooperatively receive a corresponding flange on said cage, said cage and said drum rotating together as a unit, a clutch device for causing said drum and cage to turn with said driven shaft as one, a brake device for holding said drum and cage against rotation, and means for operating said clutch and brake devices for the purposes specified.

2. In reversing gears, a driving shaft and a driven shaft aligned therewith, a drum having a head at one end provided with a central aperture and having an internal flange at the other end, a standard differential gear unit comprising a cage having a bearing portion at one end fitted into the aperture of said drum head and having a flanged portion at the other end fitted into said drum in engagement with the internal flange thereof, and a brake device for holding said drum and cage against rotation and a clutch device for causing said drum and casing to turn with said driven shaft as one.

In testimony whereof I affix my signature.

D. T. SCOTT.